Patented Mar. 2, 1926.

UNITED STATES PATENT OFFICE.

EARL B. PUTT, OF NEW YORK, N. Y.

PHENOLPHTHALEIN AND PROCESS OF MAKING THE SAME.

No Drawing.   Application filed July 10, 1925.   Serial No. 42,832.

*To all whom it may concern:*

Be it known that I, EARL B. PUTT, a citizen of the United States, residing at New York, in the county of New York and State of New York, have invented certain new and useful Improvements in Phenolphthalein and Processes of Making the Same, of which the following is a specification.

This invention relates to phenolphthalein, and processes of making the same, and more particularly to a bulky, amorphous white phenolphthalein.

Phenolphthalein is a recognized drug in the United States Pharmacopœia and is sold in commerce as a white, or faintly yellowish white crystalline powder.

It has heretofore been proposed to employ, in place of the white crystalline powder, an amorphous form which is slightly yellow and which has been shown to have a greater laxative power than the pure white crystalline phenolphthalein. This yellow material is produced by dissolving crude phenolphthalein in dilute sodium hydroxid, filtering and precipitating it as a yellow precipitate with acid. The precipitate is then washed with water and finally dried.

I have found that this grade of phenolphthalein is very finely divided and amorphous without the sharp, crystalline structure exhibited in the white grade of phenolphthalein. It is also much more readily soluble in alkali and alcohol, and this greater solubility indicates the reason for its more rapid laxative action on account of its readier absorption.

The yellow amorphous phenolphthalein, however, is objected to due to the presence of impurities, which give it its color, and due to its low melting point. While the impurities are present in less than one per cent, this together with the fact that it melts below 258° C., is responsible for the failure of the material to pass certain tests prescribed in the United States Pharmacopœia and it, therefore, cannot be used in place of U. S. P. phenolphthalein without qualification.

An object of the present invention is to provide an amorphous, white phenolphthalein having the advantages of the yellow amorphous phenolphthalein which will meet the requirements of the United States Pharmacopœia relative to the presence of impurities and melting point.

In preparing the material in the amorphous form, I use pure phenolphthalein prepared by any of the well known commercial processes, and sufficiently pure to pass the requirements of the United States Pharmacopœia, in place of the crude phenolphthalein now employed in producing the yellow, amorphous form. Instead of using pure phenolphthalein, the usual raw materials, such as phenol, phthalic acid, or anhydride and a condensing agent may be employed and purify the phenolphthalein so obtained to a sufficient state of purity for use in the present process.

The pure phenolphthalein in crystal form is dissolved in water containing a small amount of sodium hydroxid, diluted, and then treated with dilute acetic acid and finally a dilute mineral acid to completely precipitate the phenolphthalein. The temperature is controlled to prevent the solution from rising to a temperature above 50° C., and is preferably maintained at substantially 40° C. The material is then filtered and the phenolphthalein obtained dried in an oven for 8 hours at a temperature of substantially 100° C., to produce a bulky, white amorphous product.

In a typical example of the process, 100 grams of white, crystalline phenolphthalein is dissolved in 100 cc. of water containing 50 cc. of 50 per cent sodium hydroxid solution at room temperature. After the solution is complete, it is diluted with 2000 cc. of water. A quantity of dilute acetic acid is then added and finally a quantity of dilute hydrochloric or other mineral acid is added until the phenolphthalein is completely precipitated. During this operation, the solution must be maintained at a temperature below 50° C., and preferably below 40° C. The acids are added slowly with vigorous stirring to prevent the precipitate agglomerating into curds or large masses. When properly stirred, the precipitate separates in a very fine state of division. The mixture is then allowed to stand until it settles, say for a period of 1 hour, and filtered. It may be filtered through filter paper, permitting it to drain for a period of 8 to 12 hours. The separated phenolphthalein is then removed from the filter paper and dried for about 8 hours at a temperature of substantially 100° C.

The bulky, amorphous product obtained has a specific gravity of .5, 100 grams of the material, when packed by tapping and jarring will fill a jar to the 200 cc. mark. A standard grade of the crystalline form of phenolphthalein will, measured in the same cylinder or jar, show that 100 grams occupy a bulk of 134 cc.

Under the microscope, the bulky, amorphous, white phenolpthalein shows the same amorphous structure as the yellow phenolphthalein referred to above, without the colored impurities, and the particles are rounded, as compared with the crystalline and sharply curved faces of ordinary crystalline phenolphthalein.

In practicing the process, it is important that the phenolphthalein employed be white and that the temperature of the solution be maintained below 50° C., or the precipitated white phenolphthalein changes into a yellow, darker colored product. The precipitation must not be too rapid or in too concentrated a solution or the material will precipitate in heavy curds which are very difficult, and sometimes impossible to purify by washing.

The precipitate must be washed entirely free of acids and salt and the filtration must not be attempted until the precipitate has settled sharply to the bottom of the tank, leaving a clear supernatant liquid. If the phenolphthalein is filtered off too soon after precipitation, it filters with difficulty and such material, if heated above 50° C., will turn yellow in color. It is usually safe to start filtration and washing after it has stood for 1 hour in the precipitating tank.

While I have described in detail the preferred practice of my process, it is to be understood that the details of procedure may be widely varied without departing from the spirit of the invention or the scope of the subjoined claims.

I claim:

1. A bulky, substantially white, amorphous phenolphthalein.

2. A bulky, white, amorphous phenolphthalein having a melting point not below 258° C.

3. The herein described process which comprises dissolving pure, crystalline phenolphthalein in a weak alkali solution, adding dilute acetic acid and a dilute mineral acid thereto to precipitate the phenolphthalein in amorphous form, and drying the precipitate.

4. The herein described process which comprises dissolving pure, crystalline phenolphthalein in a weak alkali solution, adding dilute acetic acid and a dilute mineral acid thereto to precipitate the phenolphthalein in amorphous form, stirring the solution while the acids are added to precipitate the phenolphthalein in finely divided condition, and drying the precipitate.

5. The herein described process which comprises dissolving pure, crystalline phenolphthalein in a weak alkali solution, adding dilute acetic acid and a dilute mineral acid thereto to precipitate the phenolphthalein in amorphous form, stirring the solution, and maintaining the temperature below 50° C. while the acids are added, separating the precipitate and drying it.

In testimony whereof, I affix my signature.

EARL B. PUTT.